(12) United States Patent
Li

(10) Patent No.: US 12,077,096 B2
(45) Date of Patent: Sep. 3, 2024

(54) CONCEALED ROOF LIGHT AND VEHICLE

(71) Applicant: Zhejiang Geely Holding Group Co., Ltd., Hangzhou (CN)

(72) Inventor: Shufu Li, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 18/277,769

(22) PCT Filed: Apr. 28, 2022

(86) PCT No.: PCT/CN2022/089960
§ 371 (c)(1),
(2) Date: Aug. 17, 2023

(87) PCT Pub. No.: WO2022/247579
PCT Pub. Date: Dec. 1, 2022

(65) Prior Publication Data
US 2024/0131982 A1 Apr. 25, 2024
US 2024/0227666 A9 Jul. 11, 2024

(30) Foreign Application Priority Data

May 27, 2021 (CN) .......................... 202110586613.8

(51) Int. Cl.
*B60Q 1/26* (2006.01)
*B60Q 1/00* (2006.01)

(52) U.S. Cl.
CPC .......... *B60Q 1/2611* (2013.01); *B60Q 1/0035* (2013.01); *B60Q 1/2692* (2013.01)

(58) Field of Classification Search
CPC ... B60Q 1/2611; B60Q 1/0035; B60Q 1/2692
See application file for complete search history.

(56) References Cited

U.S. PATENT DOCUMENTS 3,761,890 A * 9/1973 Fritts .................. G09F 21/04
116/28 R
4,259,660 A * 3/1981 Oliver .................. B60Q 1/2611
362/523

(Continued)

FOREIGN PATENT DOCUMENTS

CA 2771680 A1 9/2012
CN 2703678 Y 6/2005

(Continued)

OTHER PUBLICATIONS

The search report of CN application No. 2021105866138 issued on Sep. 7, 2023.

(Continued)

*Primary Examiner* — Arman B Fallahkhair
(74) *Attorney, Agent, or Firm* — Andrew C. Cheng

(57) ABSTRACT

The present invention relates to the technical field of vehicles, and in particular to a concealed rooflight and a vehicle. The concealed rooflight comprises a light box assembly and a lifting assembly; the light box assembly comprises a box body, and the box body is provided with a connecting part; the lifting assembly comprises a driving device, the driving device comprises an acting part and a fixing part, the acting part is connected to the connecting part, and the fixing part is used for fixing the lifting assembly on a vehicle body; the lifting assembly further comprises a lifting controller, and the lifting controller is used for controlling, according to a rooflight concealing instruction, the driving device to drive the light box assembly to be concealed in a concealing space of the vehicle body.

6 Claims, 4 Drawing Sheets

(56) References Cited

U.S. PATENT DOCUMENTS

| | | | | |
|---|---|---|---|---|
| 5,433,026 | A * | 7/1995 | McDermott | G09F 21/042 |
| | | | | 40/610 |
| 6,067,012 | A * | 5/2000 | Harding | B60Q 1/2611 |
| | | | | 340/471 |
| 7,147,353 | B2 * | 12/2006 | Lin | B60Q 1/05 |
| | | | | 362/486 |
| 8,649,161 | B2 * | 2/2014 | Kato | H04N 5/655 |
| | | | | 345/905 |
| 9,412,287 | B2 * | 8/2016 | Fisher | G09F 21/042 |
| 10,583,775 | B2 * | 3/2020 | Garcia | B60Q 1/2692 |
| 10,636,335 | B2 * | 4/2020 | Kis-Benedek Pinero | |
| | | | | G09F 21/04 |
| 10,668,793 | B2 * | 6/2020 | Frederick | B62D 25/06 |
| 2012/0113666 | A1 * | 5/2012 | Slipp | B60Q 1/2611 |
| | | | | 362/523 |
| 2014/0340214 | A1 * | 11/2014 | McLoughlin | B60Q 1/245 |
| | | | | 340/472 |

FOREIGN PATENT DOCUMENTS

| | | |
|---|---|---|
| CN | 203666546 U | 6/2014 |
| CN | 104008672 A | 8/2014 |
| CN | 205131063 U | 4/2016 |
| CN | 208515476 U | 2/2019 |
| CN | 209240976 U | 8/2019 |
| CN | 110816395 A | 2/2020 |
| CN | 113547977 A | 10/2021 |
| CN | 215922042 U | 3/2022 |
| DE | 102007048226 A1 | 4/2008 |
| WO | 2015199182 A1 | 12/2015 |

OTHER PUBLICATIONS

International Search Report of PCT Patent Application No. PCT/CN2022/089960 issued on Jul. 15, 2022.

* cited by examiner

CONCEALED ROOF LIGHT AND VEHICLE

CROSS REFERENCE TO RELATED APPLICATIONS

The present disclosure is a 35 U.S.C. 371 National Phase conversion of International (PCT) Patent Application No. PCT/CN2022/089960, filed on Apr. 28, 2022, which claims priority of Chinese patent application No. CN202110586613.8 filed on May 27, 2021. The entire contents of the above-identified applications are incorporated herein by reference. The PCT International Patent Application was filed and published in Chinese.

TECHNICAL FIELD

The present invention relates to the technical field of vehicles, and in particular, to a concealed roof light and a vehicle.

BACKGROUND

Cruise taxis are an integral part of a urban comprehensive traffic and transportation system, bear responsibility for supplementing capacity of urban public transportation, and provide personalized transportation services to the public. In recent years, with rapid development of the mobile internet industry, a new industry format of integrating traditional traffic and transportation and the internet has flourished, so that online taxi ride-hailing has become just an important way for users to travel. In order to actively and steadily promote reform of taxi industry, encourage innovation, promote transformation, and better meet the travel needs of the people, the Guiding Opinions of the General Office of the State Council on Deepening Reform and Promoting the Healthy Development of the Taxi Industry points out seizing benefit opportunity to implement the "Internet plus" action, adhering to a problem orientation, promoting transformation and upgrading of cruise taxis, standardizing operation of online ride-hailing taxis, and promoting integration and development of the two business formats.

In existing technology, traditional cruise taxi drivers access online ride-hailing platforms by registering, thereby being able to accept online ride-hailing orders. But this approach only achieves accepting online ride-hailing orders by cruise taxis from the perspective of cruise taxi drivers, but does not consider appearances of vehicles. From the perspective of users, cruise taxis differ greatly from online ride-hailing taxis in terms of appearance and service standards provided. Therefore, this solution cannot truly achieve integration of cruise taxis and online reservation taxis. This results in inability of cruise taxis to integrate and develop with online ride-hailing taxis, leading to resource waste.

SUMMARY OF THE DISCLOSURE

The technical problem to be solved by the present invention is a problem that existing cruise taxis cannot truly integrate with online ride-hailing taxis.

In order to solve the above technical problem, in a first aspect, an embodiment of the present application discloses a concealed roof light comprising a light box assembly and a lifting assembly; the light box assembly comprises a box body, and the box body is provided with a connecting part; the lifting assembly comprises a driving device, the driving device comprises an acting part and a fixing part, the acting part is connected to the connecting part, and the fixing part is configured to fix the lifting assembly on a vehicle body; the lifting assembly further comprises a lifting controller, and the lifting controller is configured to control, according to a roof light concealing instruction, the driving device to drive the light box assembly to be concealed in a concealing space of the vehicle body.

Furthermore, the driving device is an electric push rod or a drive motor.

Furthermore, the lifting assembly further comprises a connecting element, the acting part is connected to the connecting part through the connecting element.

As an optional implementation, the connecting element is a support plate, and the support plate is connected to the acting part; the lifting assembly further comprises a support bracket, the support bracket comprises a first pillar and a second pillar parallel to each other, and each of the first pillar and the second pillar has an end arranged on the support plate; the connecting part comprises a first connecting part and a second connecting part with opposite positions, the first connecting part is connected to the first pillar, and the second connecting part is connected to the second pillar.

As another optional implementation, the fixing part is a rotation base, one end of the rotation base is connected to the acting part, and another end of the rotation base is connected to the connecting part.

As another optional implementation, the connecting part is a connecting arm, the driving device is the drive motor, and the acting part is an output shaft of the drive motor; one end of the connecting arm is connected to the output shaft, and another end of the connecting arm is connected to the connecting part.

As another optional implementation, the box body further comprises a mounting part, the mounting part and the connecting part have opposite positions, and the mounting part is configured to be hinged with the vehicle body.

Furthermore, the concealed roof light further comprises a baffle, and the baffle is configured to cooperate with the concealing space to form a closed reception cavity.

Furthermore, the light box assembly further comprises a display screen, the display screen is arranged in the box body, and the display screen is configured for operation status information of a vehicle.

In a second aspect, an embodiment of the present application discloses a vehicle, the vehicle comprises a vehicle body, the vehicle body is provided with a concealing space, and the concealing space is configured to receive the aforementioned concealed roof light.

By using the above technical solutions, the concealed roof light and the vehicle according to the embodiments of the present application have the following advantageous effect: in the concealed roof light, by connecting the light box assembly with the lifting assembly, when receiving the roof light concealing instruction, the lifting controller in the lifting assembly can control the driving device to drive the light box assembly to be concealed in the concealing space of the vehicle body. When the concealed roof light is used on a cruise vehicle, by concealing the roof light, the cruise vehicle and an online ride-hailing vehicle have a consistent appearance, such that real fusion of cruise vehicles and online ride-hailing vehicles is realized, and experience of users of online ride-hailing vehicle platforms is improved.

BRIEF DESCRIPTION OF THE DRAWINGS

In order to explain technical solutions of embodiments of the present application more clearly, drawings required to be used in description of embodiments will be briefly introduced below. It is obvious that the drawings in the following description are only some embodiments of the present application. For those skilled in the art, other drawings can be further obtained according to these drawings without paying creative work.

Figure 1:
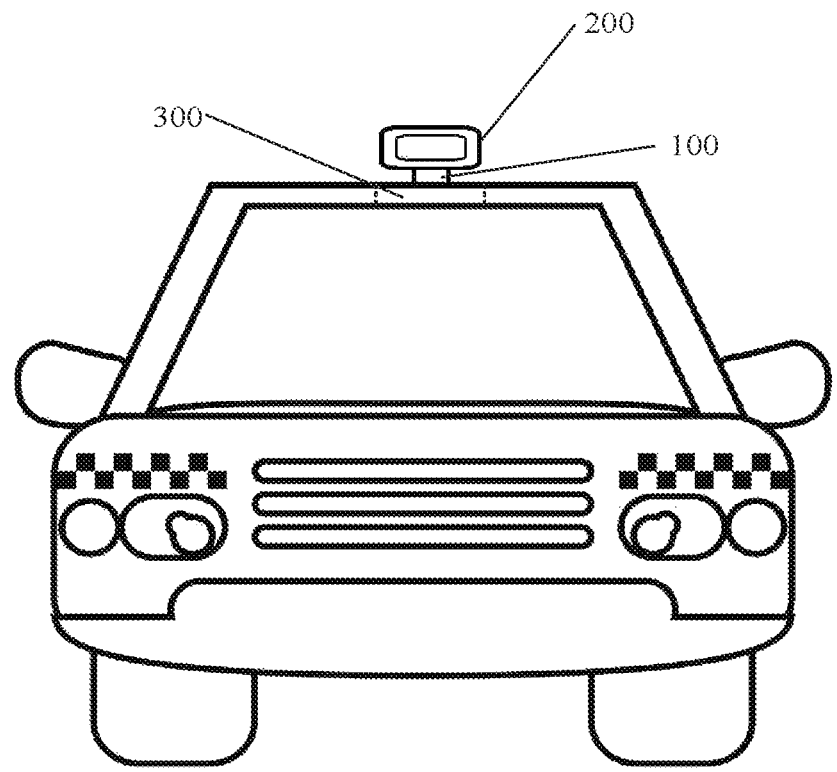
FIG. 1 is a structural schematic view of a concealed roof light of an embodiment of the present application.

The following are supplementary explanations for the attached drawings: 100—lifting assembly; 101—support plate; 102—first pillar; 103—second pillar; 104—rotation disc; 105—fixing disc; 106—connecting arm; 111—electric push rod; 112—drive motor; 200—light box assembly; 201—box body; 202—electronic component; 300—concealing space.

DETAILED DESCRIPTION

The technical solutions in the embodiments of the present application will be described clearly and completely below in combination with the drawings in the embodiments of the present application. Obviously, the described embodiments are merely some embodiments of the present application, rather than all embodiments. Based on the embodiments of the present application, any other embodiment obtained by one of ordinary skill in the art on the premise of paying no creative work belongs to the protection scope of the present application.

"One embodiment" or "embodiment" mentioned here refers to a specific feature, structure, or characteristic that can be included in at least one implementation of the present application. In the description of the present application, it should be understood that orientations or positional relationships indicated by the terms "up", "down", "top", "bottom", and so on are based on orientations or positional relationships shown in the attached drawings, and only for convenience of describing the present application and simplifying the description, rather than indicating or implying that the device or component referred to must have a specific orientation, or be constructed and operated in a specific orientation, and therefore cannot be considered as a limitation of the present application. In addition, the terms "first", "second" and the like are only used for the purpose of description, and cannot be understood as indicating or implying relative importance or implying the quantity of technical features indicated. Therefore, features limited by "first", "second", and the like can explicitly or implicitly include one or more of these features. Moreover, the terms "first", "second", and the like are used to distinguish similar objects, and are not necessarily used for describing a specific sequence or order. It should be understood that the data used in this way can be interchanged in appropriate cases, so that the embodiments of the present application described here can be implemented in orders other than those illustrated or described here.

With the arrival of the Internet Age, integration of cruise taxis and online ride-hailing taxis is an inevitable development trend of cruise taxis. Although the existing cruise taxis can achieve accepting online orders through registration on online ride-hailing platforms by drivers, due to appearances of the cruise taxis and the way of providing services, the main operation mode of the cruise taxis still relies on cruising on roads and accepting passengers' beckoning orders and cannot provide services to meet the personalized needs of passengers. For the cruise taxis, the biggest difference in appearance from regular online reservation taxis is that roofs of the cruise taxis are equipped with roof lights.

An embodiment of the present application provides a concealed roof light, FIG. 1 is a structural schematic view of a concealed roof light of an embodiment of the present application. As shown in FIG. 1, it includes a light box assembly 200 and a lifting assembly 100. The light box assembly 200 includes a box body 201, and the box body 201 is provided with a connecting part. The lifting assembly 100 includes a driving device, the driving device includes an acting part and a fixing part, the acting part is connected to the connecting part, and the fixing part is configured to fix the lifting assembly 100 on a vehicle body. The lifting assembly 100 further includes a lifting controller, and the lifting controller is configured to control, according to a roof light concealing instruction, the driving device to drive the light box assembly 200 to be concealed in a concealing space 300 of the vehicle body.

In the concealed roof light according to this embodiment of the present application, by connecting the light box assembly 200 with the lifting assembly 100, when receiving the roof light concealing instruction, the lifting controller in the lifting assembly 100 can control the driving device to drive the light box assembly 200 to be concealed in the concealing space 300 of the vehicle body. When the concealed roof light is used on a cruise vehicle, by concealing the roof light, the cruise vehicle and an online ride-hailing vehicle have a consistent appearance, such that real fusion of cruise vehicles and online ride-hailing vehicles is realized, and experience of users of online ride-hailing vehicle platforms is improved.

Figure 2:
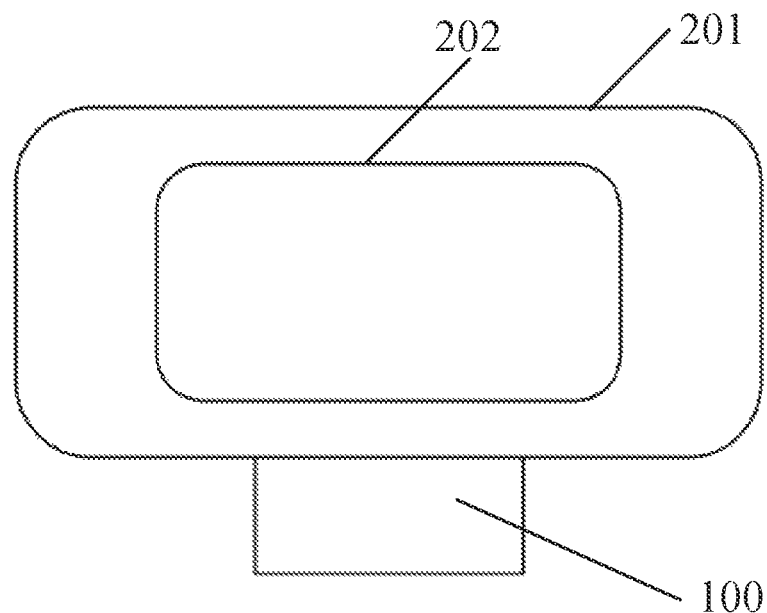
FIG. 2 is a structural schematic view of a concealed roof light of an embodiment of the present application.
Figure 3:
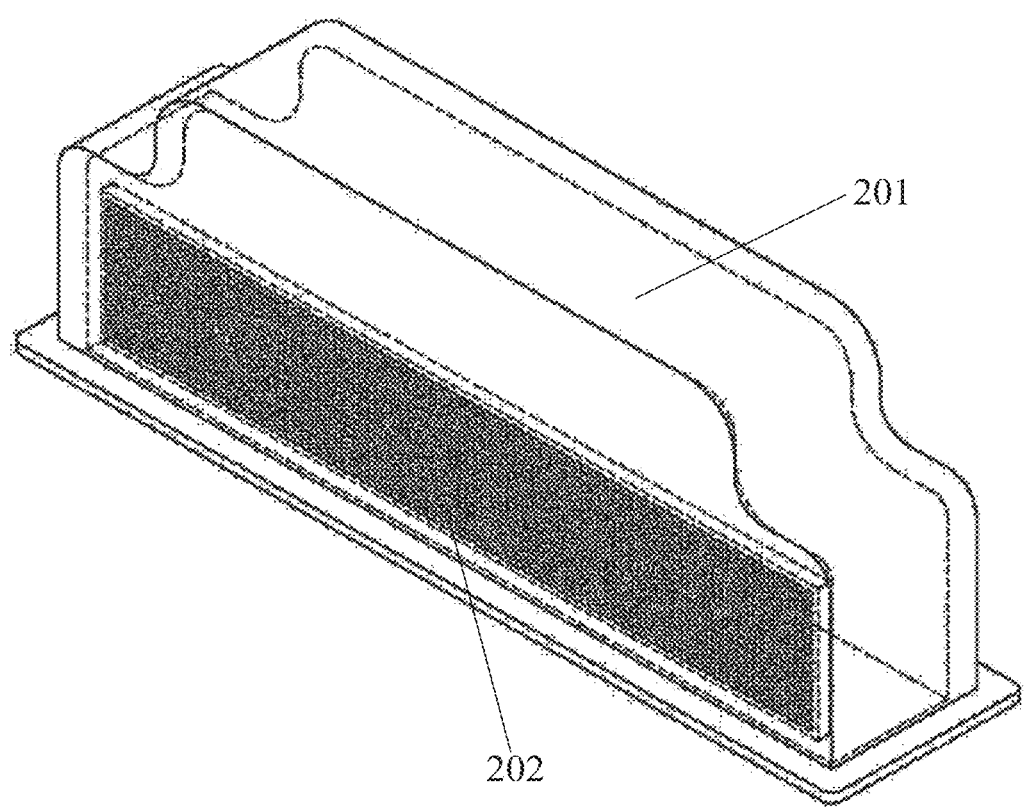
FIG. 3 is a structural schematic view of a light box assembly of an embodiment of the present application.

In embodiments of the present application, FIG. 2 is a structural schematic view of a concealed roof light of an embodiment of the present application. As shown in FIG. 2, the light box assembly 200 is a functional assembly of the concealed roof light. The light box assembly 200 includes a box body 201 and an electronic component 202 arranged in the box body 201 to implement specific functions, such as an information display function, an information projection function, an illumination function, etc. The box body 201 is configured to connect and support the electronic component 202. Optionally, the box body 201 can be a support base, and the electronic component 202 is arranged on the support base. FIG. 3 is a structural schematic view of a light box assembly 200 of an embodiment of the present application, as shown in FIG. 3, the box body 201 can also be a fixing frame, an edge of the electronic component 202 is clamped by the fixing frame to realize fixing of the electronic component 202. In some embodiments, the box body 201 can also be used to protect the electronic component 202. For example, the box body 201 is a relatively closed casing structure. Optionally, the box body 201 is a protection casing formed by a at least one component, and the electronic component 202 is arranged inside the casing. It should be understood that "closed" mentioned here refers to that the casing protects the whole electronic components 202, but the casing can also be provided with structures such as weight reducing holes, breathable holes, etc. The box body 201 is provided with the connecting part, and the connecting part is configured to realize connection with the lifting assembly 100. The connecting part can be arranged on any place of the box body 201, such as bottom, back, and other places of the box body 201.

In an embodiment of the present application, as shown in FIG. 2, the lifting assembly 100 is a drive assembly for motion of the concealed roof light. The lifting assembly 100 includes the driving device that provides driving force. Optionally, the driving device is a power device such as an electric push rod 111 or a driving motor 112. The fixing part of the driving device is mounted and fixed with the vehicle body, and the acting part is a power transmission structure, such as a telescopic end of the electric push rod 111, an output shaft of the driving motor 112, etc. The connection part on the box body 201 is connected to the acting part of the driving device, thereby achieving driving the light box assembly 200 to move by the driving device. Optionally, the connecting part can be directly connected to the acting part. As an optional implementation, the connecting part is provided with a connecting structure matched with the lifting assembly 100, and the box body 201 is connected to the lifting assembly 100 through this connecting structure. Optionally, a connecting method between the connecting part and the lifting assembly 100 includes welding, bonding, clamping, threaded connection, rivet connection, screw connection, and other methods. In some embodiments, the lifting assembly 100 further includes a connecting element, and the connecting part can also be connected to the acting part through the connecting element. The structure and the type of the connecting element can be selected based on the size of layout space for transmission mechanisms and the concealed roof light.

In an embodiment of the present application, the lifting assembly 100 further includes a lifting controller, the lifting controller is configured to receive a roof light concealing instruction and control, according to the roof light concealing instruction, the driving device to drive, according to a preset stroke, the light box assembly 200 to contract into the concealing space 300 in the vehicle body. The lifting controller is further configured to receive a roof light showing instruction and control, according to the roof light showing instruction, the driving device to drive, according to a preset stroke, the light box assembly 200 to extend out of the concealing space 300 in the vehicle body and be shown outside the vehicle body. Optionally, the lifting controller can be an intelligent electronic device (IED), and can also be a single-chip computer or other device in which control programs can be written.

In an embodiment of the present application, as shown in FIG. 1, a top of the concealing space 300 is an spread opening, allowing the concealed roof light to freely enter and exit the concealing space 300. In some embodiments, the concealed roof light further includes a baffle, and the baffle is configured to cooperate with the concealing space 300 to form a closed reception cavity. In order to ensure sealing of the concealing space 300 and integrity of an appearance of the vehicle body, and improve concealing effect, the baffle can be arranged to seal the extension opening at the top of the concealing space 300. An upper surface of the baffle is painted with the same color as the vehicle body, thereby making the vehicle body have a beautiful appearance. When the concealed roof light is concealed in the concealing space 300, the baffle extends to block the extension opening at the top of the concealing space 300, so as to prevent debris, dust, and so on from falling into the concealing space 300 and maintain cleanliness of the concealing space 300. Optionally, the baffle is connected to the vehicle body through a telescopic mechanism. When the concealed roof light is concealed in the concealing space 300, the baffle automatically extends out to block the extension opening at the top of the concealing space 300. The baffle can also be connected to the vehicle body through a folding mechanism. When the concealed roof light is concealed in the concealing space 300, the baffle automatically flips over to block the extension opening at the top of the concealing space 300. It should be noted that the baffle is not necessarily a separate component, but can also be provided by components of the light box assembly 200 or of the lifting assembly 100. For example, the box body 201 can act as a baffle to block the extension opening.

Figure 4:
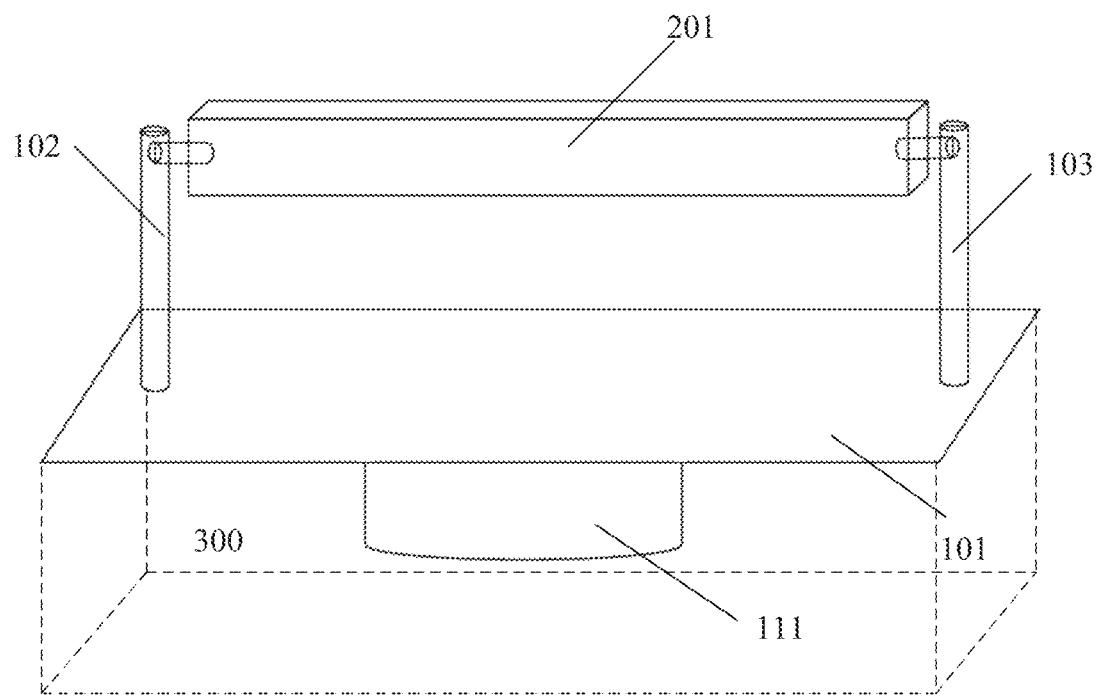
FIG. 4 is a structural schematic view of a concealed roof light of an embodiment of the present application.

As an optional implementation, FIG. 4 is a structural schematic view of a concealed roof light of an embodiment of the present application. As shown in FIG. 4, the connecting element is a support plate 101, and the support plate 101 is connected to the acting part. The lifting assembly 100 further includes a support bracket, the support bracket comprises a first pillar 102 and a second pillar 103 parallel to each other, and each of the first pillar 102 and the second pillar 103 has an end arranged on the support plate 101. The connecting part includes a first connecting part and a second connecting part with opposite positions, the first connecting part is connected to the first pillar 102, and the second connecting part is connected to the second pillar 103. In this implementation, the driving device can be the electric push rod III or other automatic telescopic devices. The support plate 101 is arranged on the acting part, the light box assembly 200 is mounted on the support plate 101 through the support bracket, and two sides of the box body 201 of the light box assembly 200 are hung on the support bracket. When the concealed roof light is mounted on a vehicle, an arranging direction of the electric push rod 111 relative to a top plane of the vehicle body is arrangement along a vertical direction. The lifting controller controls extension and retraction of electric push rod 111 to drive the support plate 101 to lift, and further drives the light box assembly 200 to lift, so that the light box assembly 200 extends out of the concealing space 300 in the vehicle body or conceals in the concealing space 300 in the vehicle body. In some embodiments, in the box body 201 of the light box assembly 200 or in the whole structure of the light box assembly 200, one surface is a plane, the plane can be painted with the same color as the vehicle body, and the surface and the extension opening of the concealing space 300 in the vehicle body have equal interface contour shapes and similar sizes. Each of the first connecting part and the second connecting part of the light box assembly 200 is provided with a rotation shaft, and the first pillar 102 and the second pillar 103 are respectively provided with hinged holes, the two rotation shafts are connected to the hinged holes in the first pillar 102 and the second pillar 103 respectively, such that the light box assembly is rotatable relative to the support plate 101. Rotation of the light box assembly 200 relative to the support plate 101 can also be driven by a motor. For example, the first pillar 102 or the second pillar 103 is provided thereon with a motor, and one of the rotation shafts on the light box connecting element is connected to an output shaft of the motor. When the light box assembly 200 conceals in the concealing space 300, the motor drives the light box assembly 200 to flip over, so that the plane painted with the same color as the vehicle body faces the outside, thereby achieving sealing of the extension opening of the concealing space 300 and improving concealing effect. In other embodiments, the support plate 101 and the extension opening of the concealing space 300 also have equal interface contour shapes and have equal or similar sizes; when the light box assembly 200 extends out of the concealing space 300, the support plate 101 can achieve sealing for the extension opening of the concealing space 300, thereby preventing rainwater or debris from falling into the concealing space 300.

Figure 5:
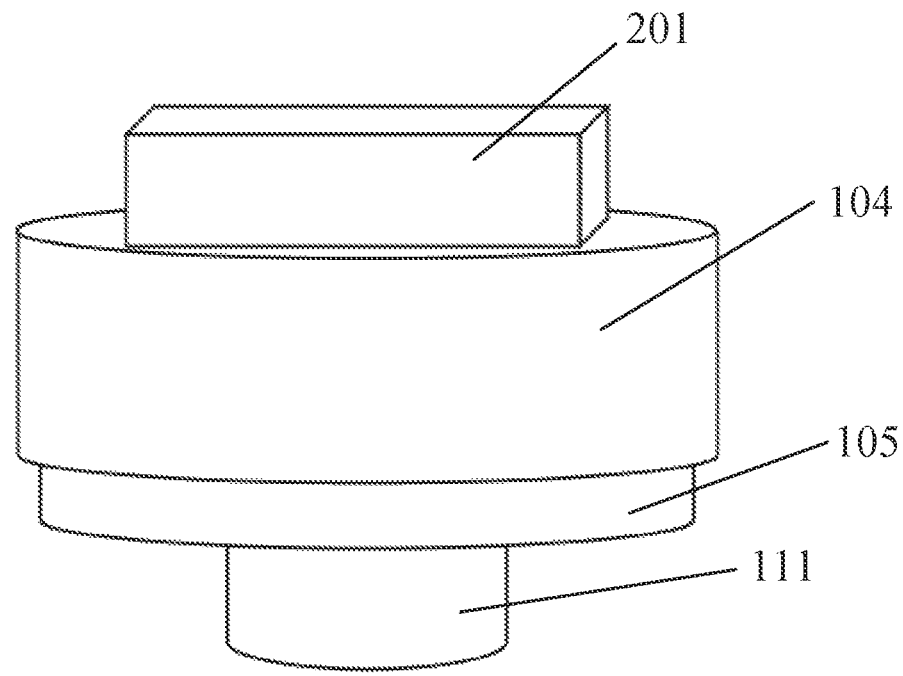
FIG. 5 is a structural schematic view of a concealed roof light of an embodiment of the present application.

As another optional implementation, FIG. 5 is a structural schematic view of a concealed roof light of an embodiment of the present application. As shown in FIG. 5, the connecting part is a rotation base, one end of the rotation base is connected to the acting part, and another end of the rotation base is connected to the connecting part. In this implementation, the driving device can be the electric push rod 111 or other automatic telescope devices. The rotation base is arranged on the acting part, and the light box assembly 200 is mounted on the rotation base. Optionally, the rotation base includes a rotation motor, a rotation disc 104, and a fixing disc 105; the fixing disc 105 is fixed on the acting part, the rotation motor is arranged on the fixing disc 105, and the rotation disc is connected to a rotation shaft of the rotation motor. Optionally, the rotation motor drives the rotation disc 104 to rotate by 360°. Optionally, the fixing disc 105 is provided thereon with a limit block, the rotation disc 104 is provided thereon with a limit protrusion matching with the limit block, the limit block matches with limit protrusion to limit a rotation angle of the rotation disc 104. Optionally, there are two limit blocks on the fixing disc 105, and there is an included angle with a preset degree between each of the two limit blocks and a rotation center, the limit protrusion rotates between the two limit blocks, and the angle is a rotatable angle of the rotation disc 104. When the concealed roof light is mounted on a vehicle, an arranging direction of the electric push rod 111 relative to a top plane of a vehicle body is arrangement along a vertical direction. The electric push rod 111 telescopes to drive the rotation base to lift, and further drive the light box assembly 200 to lift, so that the light box assembly 200 extends out of the concealing space 300 in the vehicle body or is concealed in the concealing space 300 in the vehicle body. When the light box assembly 200 extends out of the concealing space 300 in the vehicle body, by controlling the rotation motor to activate, the rotation disc 104 is driven to rotate, and thus the light box assembly 200 is driven to realize rotation. Optionally, the rotation base and the extension opening of the concealing space 300 have equal interface contour shapes and have equal or similar sizes; when the light box assembly 200 extends out of the concealing space 300, the support plate 101 can achieve sealing for the extension opening of the concealing space 300, thereby preventing rainwater or debris from falling into the concealing space 300.

Figure 6:
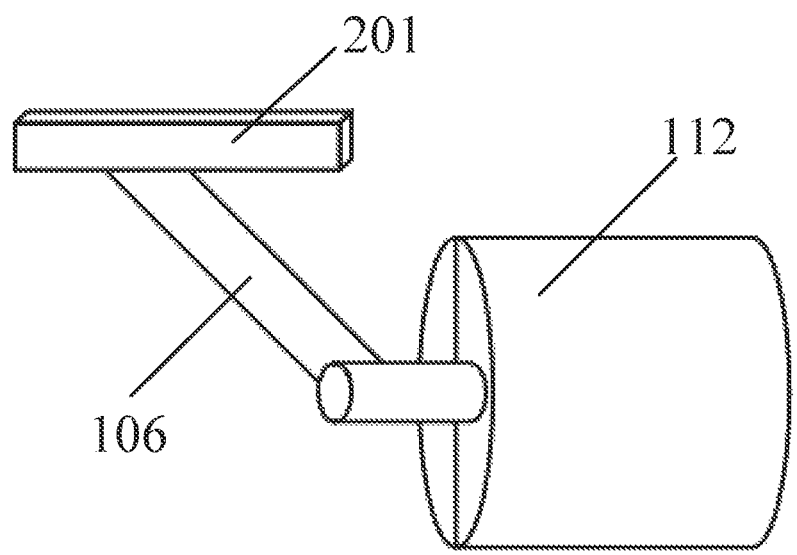
FIG. 6 is a structural schematic view of a concealed roof light of an embodiment of the present application.

As another optional implementation, FIG. 6 is a structural schematic view of a concealed roof light of an embodiment of the present application. As shown in FIG. 6, the connecting part is a connecting arm 106, the driving device is the drive motor 112, and the acting part is an output shaft of the drive motor 112. One end of the connecting arm 106 is connected to the output shaft, and another end of the connecting arm 106 is connected to the connecting part. In this implementation, the output shaft of the drive motor 112 is approximately parallel relative to a top plane of a vehicle body. An end of the connecting arm 106 is provided with a mounting hole, the connecting arm 106 is fixed together with the output shaft of the drive motor 112 through the mounting hole, thereby rotating along with the output shaft. The connecting arm 106 can also be connected to the output shaft of the drive motor 112 by means of welding. Another end of the connecting arm 106 is connected to the connecting part of the box body 201. When the concealed roof light is mounted on a vehicle, the output shaft of the motor rotates to drive the connecting arm 106 to swing, and further drive the light box assembly 200 to rotate upwards and downwards in a vertical direction relative to a vehicle body, so that the light box assembly 200 extends out of the concealing space 300 in the vehicle body or conceals in the concealing space 300 in the vehicle body. The vehicle body is further provided with a limit structure to limit a swinging angle of the connecting arm 106, and thus a vehicle body space occupied by the concealing space 300 can be reduced.

Figure 7:
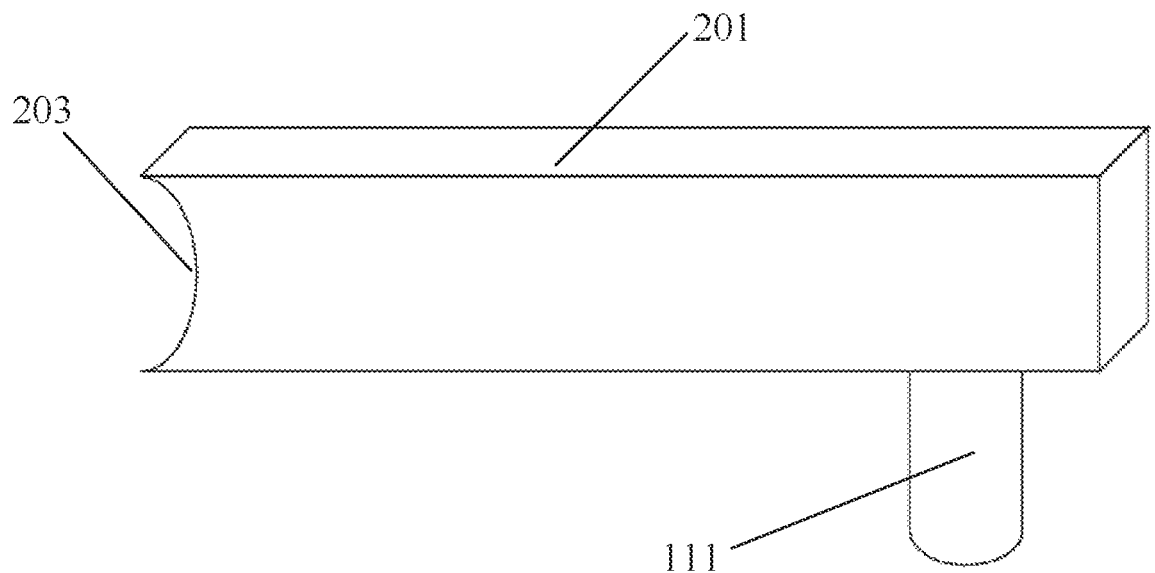
FIG. 7 is a structural schematic view of a concealed roof light of an embodiment of the present application.

As another optional implementation, FIG. 7 is a structural schematic view of a concealed roof light of an embodiment of the present application. As shown in FIG. 7, the concealing method of the light box assembly 200 can also be concealing through a folding manner, and a top surface of the light box assembly 200 itself serves as a baffle. The box body 201 further includes a mounting part, the mounting part and the connecting part have opposite positions, and the mounting part is configured to be hinged with a vehicle body. In this implementation, the driving device can be the electric push rod 111 or other automatic telescope devices. The box body 201 can be divided into two opposite sides, such as left and right sides, the mounting part is arranged on the left portion of the box body 201, the connecting part is arranged on the right portion of the box body 201; the connecting part is connected to an acting end of the electric push rod 111, the mounting part is hinged with a vehicle body, and the box body 201 can rotate around a hinging axis. When the concealed roof light is mounted on a vehicle, the electric push rod 111 is arranged along a vertical direction relative to a top of a vehicle body, the electric push rod 111 telescopes to drive one side of the box body 201 to lift, and the other side of the box body 201 is stable relative to the vehicle body. When one side of the box body 201 rises, that is, the light box assembly 200 rises, showing of the light box assembly 200 is realized. When one side of the box body 201 declines to an original point, that is, the light box assembly 200 declines, concealing of the light box assembly 200 is realized.

An embodiment of the present application provides a vehicle, the vehicle includes a vehicle body, the vehicle body is provided with a concealing space 300, and the concealing space 300 is configured to accommodate the aforementioned concealed roof light.

In embodiments of the present application, the concealing space 300 in the vehicle body refers to an opening or avoidance space configured for concealing the light box assembly 200. A size of the concealing space 300 should be greater than a size of the light box assembly 200. Preferably, the concealing space 300 has a contour shape similar to that of the light box assembly 200. A bottom of the concealing space 300 can be communicated with an interlayer space of the vehicle body, and it is also possible to make the concealing space 300 become an independent space by setting a bottom wall and a side wall. In order to ensure integrity of appearance of the vehicle body, an external opening of the concealing space 300 can be concealed and blocked by setting a baffle that has an appearance consistent with that of the vehicle body. The concealing space 300 is configured to arrange concealed roof lights therein. For specific implementation of the concealed roof lights, please refer to the above all methods of describing the concealed roof lights.

Figure 8:
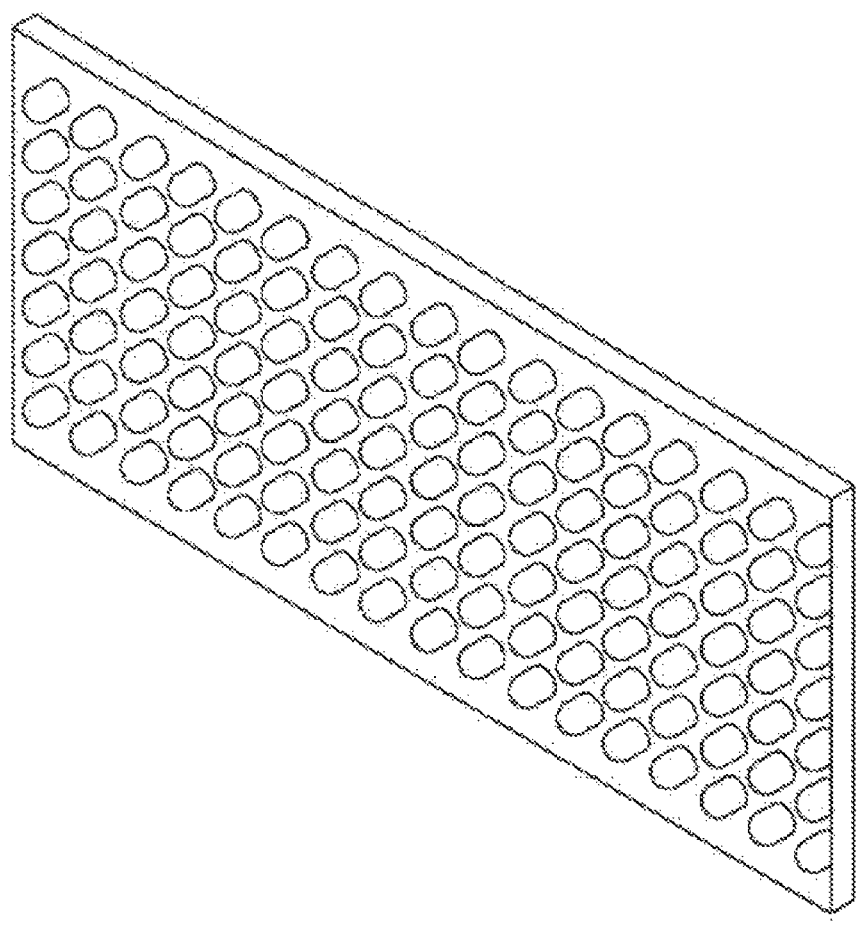
FIG. 8 is a structural schematic view of an electronic component of an embodiment of the present application.

It should be noted that, in the concealed roof light described in the embodiments of the present application, according to difference of application scenarios of concealed roof lights, the electronic component 202 in the light box assembly 200 can be different components or devices so as to achieve different functions. FIG. 8 is a structural schematic view of an electronic component 202 of an embodiment of the present application. As shown in FIG. 8, when a concealed roof light is applied to a cruising vehicle, the electronic component 202 can be a light emitting diode (LED) display screen, the LED display screen can be set in the box body 201 as a display device for passenger status, so as to display vehicle operating status information, i.e., a passenger status, of the cruising vehicle. Of course, the LED display screen, besides displaying the passenger status of the cruising vehicle, can also display projected advertisements, subtitles, etc. It should be noted that the concealed roof lights can be applied not only to cruising vehicles, but also to ordinary vehicles. In this case, different electronic components 202 can be selected according to requirements of application scenarios. For example, for off-road vehicles, or vehicle users who like off-road activities, in a concealed roof light set on a vehicle, a search light can be selected as the electronic component 202 to realize the function, so as to meet user's outdoor lighting needs. For another example, for vehicle users who like light shows, in a concealed roof light set on a vehicle, a stage light can be selected as the electronic component 202 to realize the function. The selection of the electronic component 202 is not limited to the above examples, but can also include displays, projectors, or other devices; specifically, customized designs can be made according to needs of users, so as to meet users' personalized needs.

The above described are only preferred embodiments of the present application, and are not intended to limit the present application. Any modifications, equivalent replacements, improvements, and so on made within spirit and principles of the present application shall be included in the protection scope of this application.

What is claimed is:

1. A concealed roof light comprising a light box assembly and a lifting assembly; wherein the light box assembly comprises a box body, and is configured to be connected to a vehicle body of a vehicle and indicate that the vehicle is used as a cruise taxi; the lifting assembly is configured to be fixed on a vehicle body of a vehicle and comprises a driving device connected to the light box assembly, and the lifting assembly is further configured to drive, according to a roof light concealing instruction, the light box assembly to be concealed in a concealing space of the vehicle body to conceal cruise taxi indication of the vehicle, so that the vehicle is no longer used as a cruise taxi and changes to be used as an online reservation taxi;

wherein the lifting assembly further comprises a connecting element, the driving device is connected to the light box assembly through the connecting element;

wherein the driving device is an electric push rod, the connecting element is a support plate, and the support plate is connected to the driving device; the lifting assembly further comprises a support bracket, the support bracket comprises a first pillar and a second pillar parallel to each other, and each of the first pillar and the second pillar has an end arranged on the support plate; the light box assembly comprises a first connecting part and a second connecting part with opposite positions, the first connecting part is connected to the first pillar, and the second connecting part is connected to the second pillar;

wherein the support plate is configured to lift to seal an extension opening of the concealing space when the light box assembly extends out of the concealing space.

2. The concealed roof light according to claim 1, wherein the box body is configured to act as a baffle to close the concealing space when the light box assembly is concealed in the concealing space.

3. The concealed roof light according to claim 2, wherein the light box assembly further comprises a display screen, the display screen is arranged in the box body, and the display screen is configured for operation status information of the vehicle.

4. A vehicle, wherein the vehicle comprises a vehicle body, the vehicle body is provided with a concealing space, and the concealing space is configured to receive the concealed roof light according to claim 1.

5. The concealed roof light according to claim 1, wherein both the first connecting part and the second connecting part are rotation shafts and are connected to hinged holes in the first pillar and the second pillar respectively, such that the light box assembly is rotatable relative to the support plate.

6. The concealed roof light according to claim 1, wherein the light box assembly further comprises an electronic component arranged in the box body, the electronic component is any one of a display, a search light, a stage light, and a projector.

* * * * *